US012444472B2

(12) United States Patent
Rozman et al.

(10) Patent No.: US 12,444,472 B2
(45) Date of Patent: Oct. 14, 2025

(54) LIGHT-WEIGHT BES APPROXIMATION

(71) Applicant: Sandisk Technologies, Inc., Milpitas, CA (US)

(72) Inventors: David Rozman, Kiryat-Malakhi (IL); Ariel Navon, Revava (IL); Alexander Bazarsky, Holon (IL); Alon Eyal, Zichron Yaakov (IL)

(73) Assignee: Sandisk Technologies, Inc., Milpitas, CA (US)

( * ) Notice: Subject to any disclaimer, the term of this patent is extended or adjusted under 35 U.S.C. 154(b) by 265 days.

(21) Appl. No.: 18/218,845

(22) Filed: Jul. 6, 2023

(65) Prior Publication Data

US 2024/0249783 A1    Jul. 25, 2024

Related U.S. Application Data

(60) Provisional application No. 63/440,006, filed on Jan. 19, 2023.

(51) Int. Cl.
  *G11C 16/34*  (2006.01)
  *G11C 16/08*  (2006.01)
  *G11C 16/26*  (2006.01)

(52) U.S. Cl.
  CPC .......... *G11C 16/3495* (2013.01); *G11C 16/08* (2013.01); *G11C 16/26* (2013.01)

(58) Field of Classification Search
  CPC ...... G11C 16/3495; G11C 16/08; G11C 16/26
  USPC .................................................. 365/185.09
  See application file for complete search history.

(56) References Cited

U.S. PATENT DOCUMENTS

| 10,276,233 | B1* | 4/2019  | Danjean          | G11C 11/5642 |
| 10,418,097 | B2  | 9/2019  | Avraham et al.   |              |
| 10,446,242 | B2  | 10/2019 | Achtenberg et al.|              |
| 10,957,407 | B1* | 3/2021  | Papandreou       | G11C 16/08   |
| 2020/0364103 | A1 | 11/2020 | Sharifi Tehrani |              |

FOREIGN PATENT DOCUMENTS

| JP | 2019164858 A   | 9/2019  |
| JP | 2022050898 A   | 3/2022  |
| JP | 2023500068 A   | 1/2023  |
| KR | 20210038290 A  | 4/2021  |
| KR | 20210087262 A  | 7/2021  |
| KR | 20210155799 A  | 12/2021 |
| KR | 20220105572 A  | 7/2022  |

* cited by examiner

*Primary Examiner* — Amir Zarabian
*Assistant Examiner* — Daniel John King
(74) *Attorney, Agent, or Firm* — Patterson + Sheridan, LLP

(57) ABSTRACT

A data storage device includes a memory device and a controller coupled to the memory device. When a read threshold calibration operation occurs, less than all of the pages of a representative wordline is sensed, such that read thresholds of less than all of the pages of the representative wordline is obtained. The obtained read thresholds and one or more physical conditions of the representative wordline are provided to a model to obtain the other read thresholds of the remaining pages of the representative wordline that were not sensed. The model correlates read thresholds of one page to another page of the same representative wordline and accounts for the one or more physical conditions of the representative wordline.

18 Claims, 7 Drawing Sheets

LIGHT-WEIGHT BES APPROXIMATION

CROSS-REFERENCE TO RELATED APPLICATIONS

This application claims benefit of U.S. Provisional Patent Application Ser. No. 63/440,006, filed Jan. 19, 2023, which is herein incorporated by reference.

BACKGROUND OF THE DISCLOSURE

Field of the Disclosure

Embodiments of the present disclosure generally relate to data storage devices, such as solid state drives (SSDs) and iNAND storage devices, and, more specifically, calibration of read thresholds of a memory device of the data storage device.

Description of the Related Art

During operation of a data storage device, read thresholds associated with the cell states of a memory cell of a memory device of the data storage device may shift. The shifting of the read thresholds may be caused by read disturb effects, read temperatures, previous write temperatures, temperature variations, physical degradation of the memory cell, a number of program/erase cycles, variations between dies of the memory device, and the like. Shifted read thresholds may decrease a quality of service (QOS) of the data storage device, such as by returning invalid or corrupted data in response to a read request.

A read threshold calibration operation is executed in order to determine optimized read thresholds of a memory cell. Read threshold calibration operations may include valley search and bit error rate (BER) estimation scan (BES). A valley search may be performed through a process of searching for valleys in a cell voltage distribution (CVD) by measuring a difference of conducting cells between different voltage points. In other words, a valley search looks for a minimum value between cell states. However, the minimum value may be a local minimum rather than an absolute minimum depending on the search parameters of the valley search operation. The BES operation may be performed through a process of applying a number of senses to a page of a representative wordline and then sequentially calculating a syndrome weight (SW) as an estimate of a BER. In other words, the BES operation utilizes a plurality of sense operations with shifted read values for each logical page of a representative wordline. The BES operation applies an analytical algorithm to compute the optimal shifts of each of the read thresholds for a page of the representative wordline. Read threshold calibrations may have a significant impact on latency and are expensive, time-consuming operations that may be executed during idle time or as a result of a read failure occurring.

Therefore, there is a need in the art for an improved read threshold calibration operation to reduce data storage device latency and improve quality of service of the data storage device.

SUMMARY OF THE DISCLOSURE

The present disclosure generally relates to data storage devices, such as solid state drives (SSDs) and iNAND storage devices, and, more specifically, calibration of read thresholds of a memory device of the data storage device. A data storage device includes a memory device and a controller coupled to the memory device. When a read threshold calibration operation occurs, less than all of the pages of a representative wordline are sensed, such that read thresholds of less than all of the pages of the representative wordline is obtained. The obtained read thresholds and one or more physical conditions of the representative wordline are provided to a model to obtain the other read thresholds of the remaining pages of the representative wordline that were not sensed. The model correlates read thresholds of one page to another page of the same representative wordline and accounts for the one or more physical conditions of the representative wordline.

In one embodiment, a data storage device includes a memory device and a controller coupled to the memory device. The controller is configured to perform a read threshold calibration operation on a first page of a plurality of pages of a representative wordline of the memory device to obtain a read threshold of one or more cell states associated with the first page of the representative wordline, determine one or more physical conditions of the representative wordline, and generate one or more other read thresholds for one or more other cell states associated with one or more other pages of the representative wordline using a machine learning model based on the read threshold of the one or more cell states associated with the first page of the representative wordline and the one or more physical conditions of the representative wordline.

In another embodiment, a data storage device includes a memory device and a controller coupled to the memory device. The controller is configured to generate and update a model correlating a read threshold of one or more cell states of a first page of a representative wordline to a read threshold of one or more other cell states of a second page of the representative wordline, predict calibrated read thresholds of a cell state of a page of the representative wordline based on the model, where a read threshold calibration operation is not performed on the page of the representative wordline, and associate the predicted calibrated read thresholds of the cell state of the page of the representative wordline with a corresponding read threshold of the cell state of the page of the representative wordline.

In another embodiment, a data storage device includes memory means and a controller coupled to the memory means. The controller is configured to perform a read threshold calibration operation on less than all of a total number of pages of a plurality of pages of a representative wordline and predict a read threshold of one or more cell states of a remaining number of pages of the plurality of pages of the representative wordline. The read threshold calibration operation is not performed on the remaining number of pages of the plurality of pages of the representative wordline.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs) and iNAND storage devices, and, more specifically, calibration of read thresholds of a memory device of the data storage device. A data storage device includes a memory device and a controller coupled to the memory device. When a read threshold calibration operation occurs, less than all of the pages of a representative wordline is sensed, such that read thresholds of less than all of the pages of the representative wordline is obtained. The obtained read thresholds and one or more physical conditions of the representative wordline are provided to a model to obtain the other read thresholds of the remaining pages of the representative wordline that were not sensed. The model correlates read thresholds of one page to another page of the same representative wordline and accounts for the one or more physical conditions of the representative wordline.

Figure 1:
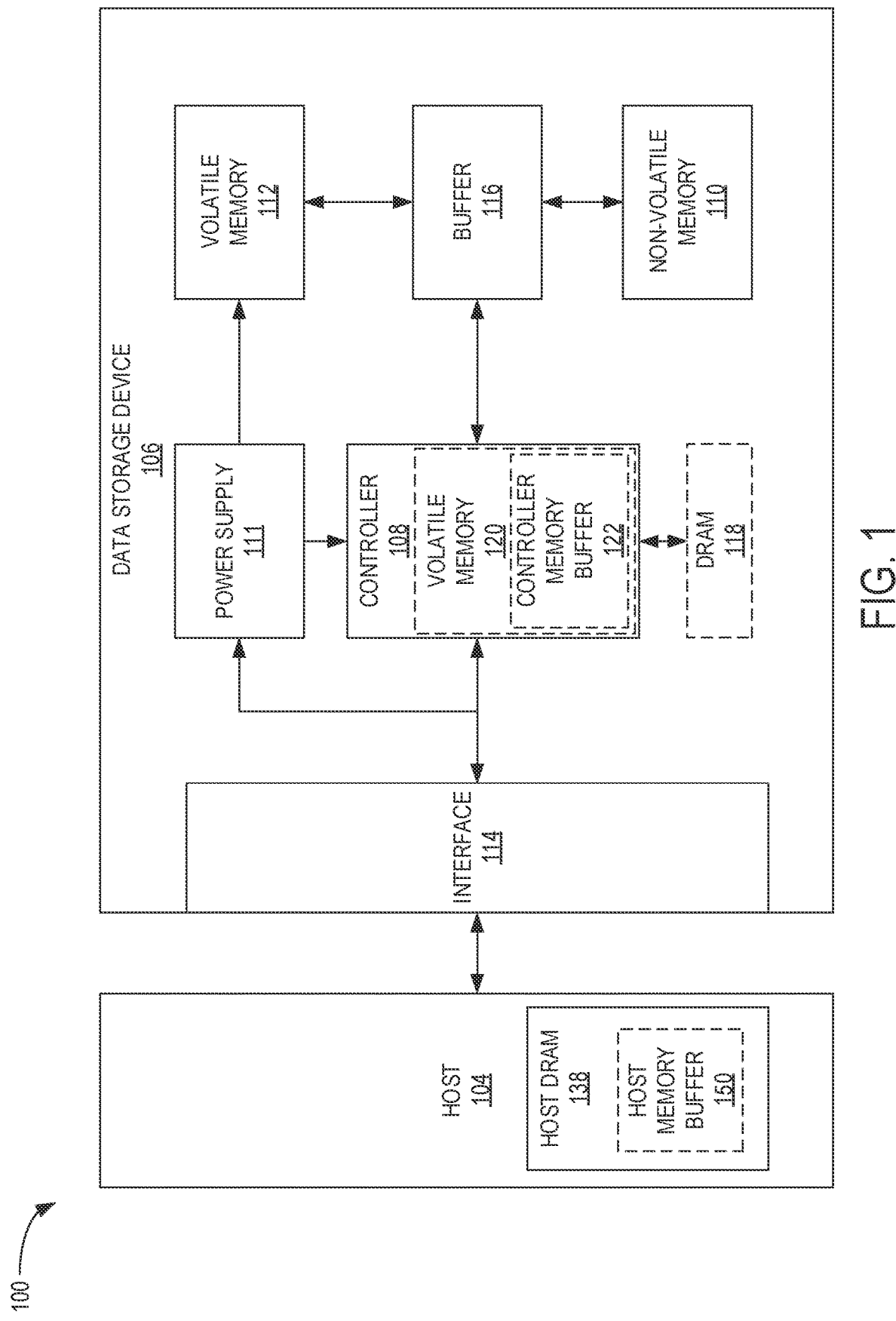
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
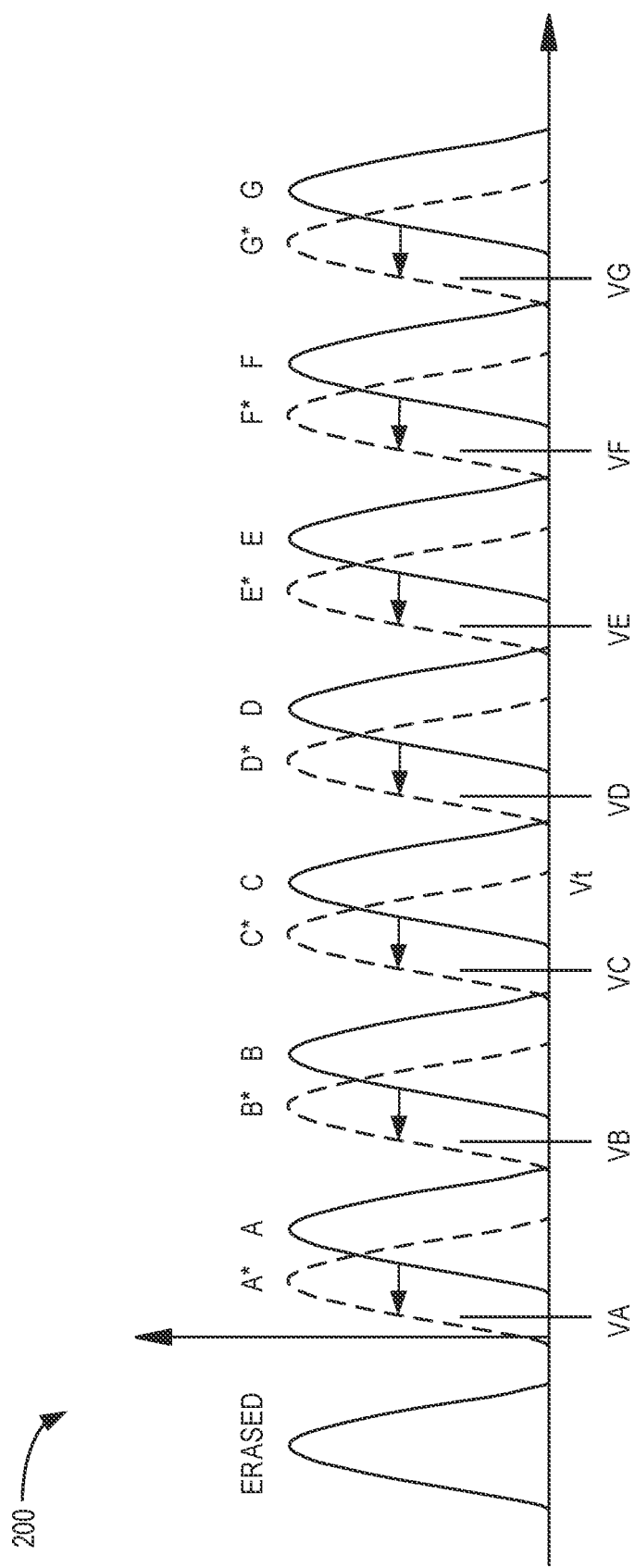
FIG. 2 is a graph illustrating threshold voltages for triple level cell (TLC) memory, according to certain embodiments.

FIG. 2 is a graph 200 illustrating threshold voltages for TLC memory, according to certain embodiments. TLC memory includes 3 bits, where each bit may have a program state of either 0 or 1. The program state refers to the state of the memory cell, whether the memory cell is empty (i.e., no data exists) or the memory cell is programmed (i.e., data exists). Furthermore, the number of unique combinations of program states can be solved in the following equation: (Total number of voltage levels)=2^(number of bits per memory cell). For the TLC memory, the number of voltage levels is eight because 2^3=8.

As the number of bits of the memory cell increases, the memory cell can record more information leading to larger data storage. Furthermore, the equation for the unique combination of program states may be applied to SLC memory, TLC memory, QLC memory, penta-layer cell (PLC) memory, and other memory densities.

The program state of 0 refers to a programmed state, whereas the program state of 1 refers to an erased state. The TLC memory has 8 voltage levels, where one is erased and seven are programmed. Furthermore, the one voltage level that is erased has a bit combination of program state 111. For any memory cell, if the bit combination only contains the program state 1, then the program state is erased (e.g., 1 for SLC, 11 for MLC, and 1111 for QLC). Listing from lowest threshold voltage, denoted by Vt on the x-axis, to highest threshold voltage in FIG. 2, the voltage levels are 111 for the erased cell state, 110 for cell state A, 100 for cell state B, 000 for cell state C, 010 for cell state D, 011 for cell state E, 001 for cell state F, and 101 for cell state G.

For a TLC memory cell, each bit of the cell state (i.e., ###) corresponds with one of an upper page, a middle page, and a lower page of the TLC memory cell. Furthermore, the lines between the curves are labeled VA, VB, VC, VD, VE, VF, and VG are related to the threshold or reference voltage. For other memory cells, the number of threshold or reference voltages can be solved by the following equation: (number of threshold or reference voltages)=(total number of voltage levels)−1. The individual pages of data can be read by performing a number of comparisons at one or more threshold points and determining whether the cell voltage is lower or higher than the threshold. Each voltage curve represents a voltage distribution for the respective cell state. It is to be understood that the cell state distribution curve is an example embodiment. It is to be further understood that a tail of the voltage curve of a cell state may overlap with a head of the voltage curve of an adjacent cell state and vice-versa.

During operation of the data storage device, the threshold voltage curve may be shifted resulting in shifted threshold voltages. In FIG. 2, the dashed curves labeled A*, B*, C*, D*, E*, F*, and G* exemplify a memory cell with a shifted read threshold. The shifting may be a result of read disturb effects, read temperatures, previous write temperatures, temperature variations, physical degradation of the memory cell, a number of program/erase cycles, variations between dies of the memory device, and the like. In order to account for the shifted read thresholds, so that read operations do not fail due to an amount of bit errors, read threshold calibration operations are conducted on the wordlines to calibrate the read thresholds of each cell state. TLC memory includes a lower page (LP), a middle page (MP), and an upper page (UP). Each of the pages may correspond to one or more cell states. For example, the LP of TLC memory corresponds to cell state A and cell state E, the MP of TLC memory corresponds to cell state B, cell state D, and cell state F, and the UP of TLC memory corresponds to cell state C and cell state G.

In order to determine the read thresholds for a certain page, one or more sense operations are performed for each of the corresponding cell states. For example, in order to determine the calibrated read thresholds for the cell states of the LP of TLC memory, one or more sense operations occurs to each threshold boundary of cell state A and one or more sense operations occurs to each threshold boundary of cell state E. Likewise, in order to perform a read calibration operation on an entire wordline, one or more sense operations are performed on each of the corresponding cell states.

Figure 3:
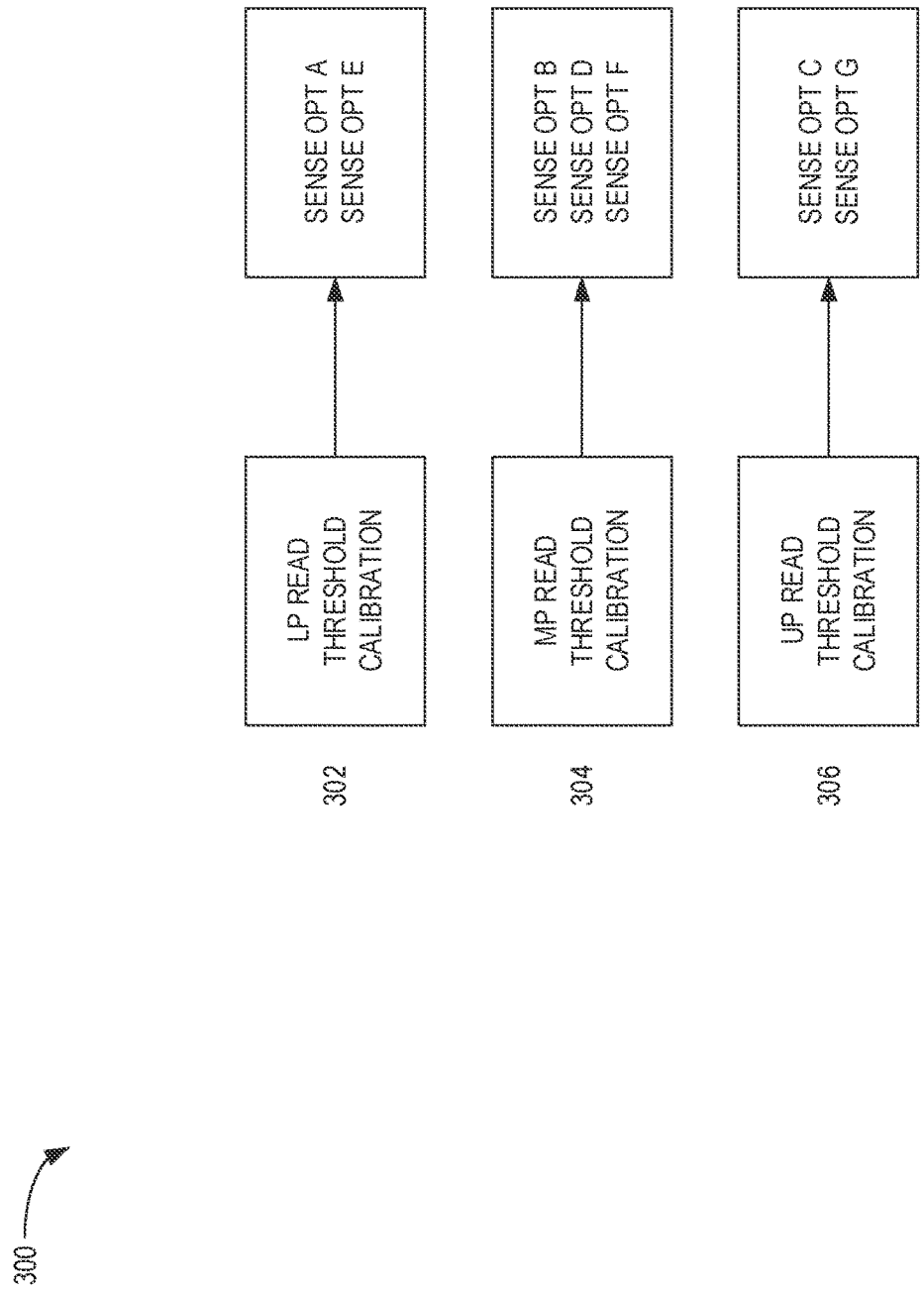
FIG. 3 is a simplified schematic illustration of a read threshold calibration operation for a representative wordline, according to certain embodiments.

FIG. 3 is a simplified schematic illustration of a read threshold calibration operation 300 for a representative wordline, according to certain embodiments. The representative wordline may be a wordline of TLC memory in the NVM 110. In other words, the wordline may have threshold voltages shown in FIG. 2. For exemplary purposes, aspects of the storage system 100 of FIG. 1 and the graph 200 of FIG. 2 may be referenced herein. The representative wordline may be a wordline that has a read failure or has been triggered by a time and temperature update, which may be periodic or triggered by a time or temperature exceeding a respective threshold value. When the representative wordline has a read failure or has been triggered by a time and temperature update, a read threshold calibration operation may be performed on the representative wordline to calibrate the read thresholds of each cell state of the representative wordline. Furthermore, the read threshold calibration may be, in a non-limiting example, a BES operation.

At step 302, the controller 108 performs a read threshold calibration operation on a LP of the representative wordline. The read threshold calibration operation on the LP of the representative wordline may provide optimized values for thresholds of cell state A (or cell state A* in cases where cell state A has shifted) and cell state E (or cell state E* in cases where cell state E has shifted). In other words, the read threshold calibration operation senses optimized read thresholds for the corresponding cell states of each page. At step 304, the controller 108 performs a read threshold calibration operation on a MP of the representative wordline. The read threshold calibration operation on the MP of the representative wordline may provide optimized values for thresholds of cell state B (or cell state B* in cases where cell state B has shifted), cell state D (or cell state D* in cases where cell state D has shifted), and cell state F (or cell state F* in cases where cell state F has shifted). At step 306, the controller 108 performs a read threshold calibration operation on an UP of the representative wordline. The read threshold calibration operation on the UP of the representative wordline may provide optimized values for thresholds of cell state C (or cell state C* in cases where cell state C has shifted) and cell state G (or cell state G* in cases where cell state G has shifted).

Figure 4:
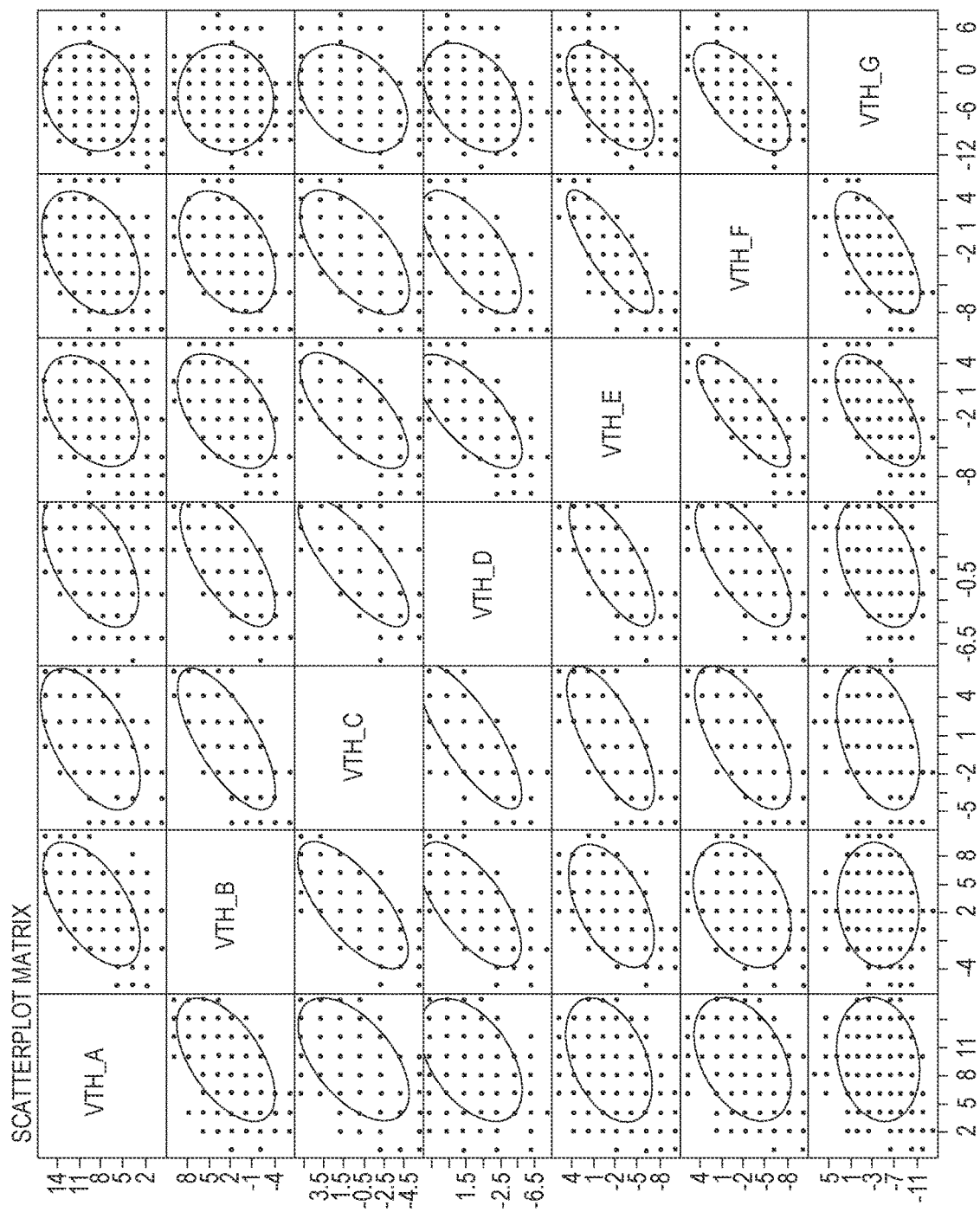
FIG. 4 is a graph showing a correlation between cell states of TLC memory, according to certain embodiments.

FIG. 4 is a graph 400 showing a correlation between cell states of TLC memory, according to certain embodiments. It is to be understood that that the correlation shown in graph 400 may be applicable to other memory architectures, such as MLC memory, QLC memory, and the like. Empirical values generated from the cross correlations between read threshold values may be obtained and input into a model to correlate threshold voltages between cell states of a representative wordline. The correlation may be seen along the diagonals of the curves in each matrix entry, where the higher the score is, the higher the cross correlation is between threshold voltages of corresponding cell states. The score may be a correlation value generated by the model, which may be a machine learning (ML) model, that allows the model to predict read threshold values of other cell states of the representative wordline.

In other words, by performing a read threshold calibration operation on a single page of a representative wordline (or in other embodiments, less than all of the pages of the representative wordline), the other read thresholds of the other pages of the representative wordline not associated with the read threshold calibration may be predicted. The predicted read thresholds may be applied to the corresponding cell states and used in subsequent read operations. Furthermore, since a read threshold calibration operation is performed on less than all of the pages of the representative wordline, the calibration of read thresholds for the all of the pages of the representative wordline may be faster than previous read threshold operations being applied to all of the pages of the representative wordline. It is to be understood that the phrase "less than all of the pages" may refer to any number of pages that is less than the total number of pages. For example, in QLC memory, less than all may be 2 pages.

Figure 5:
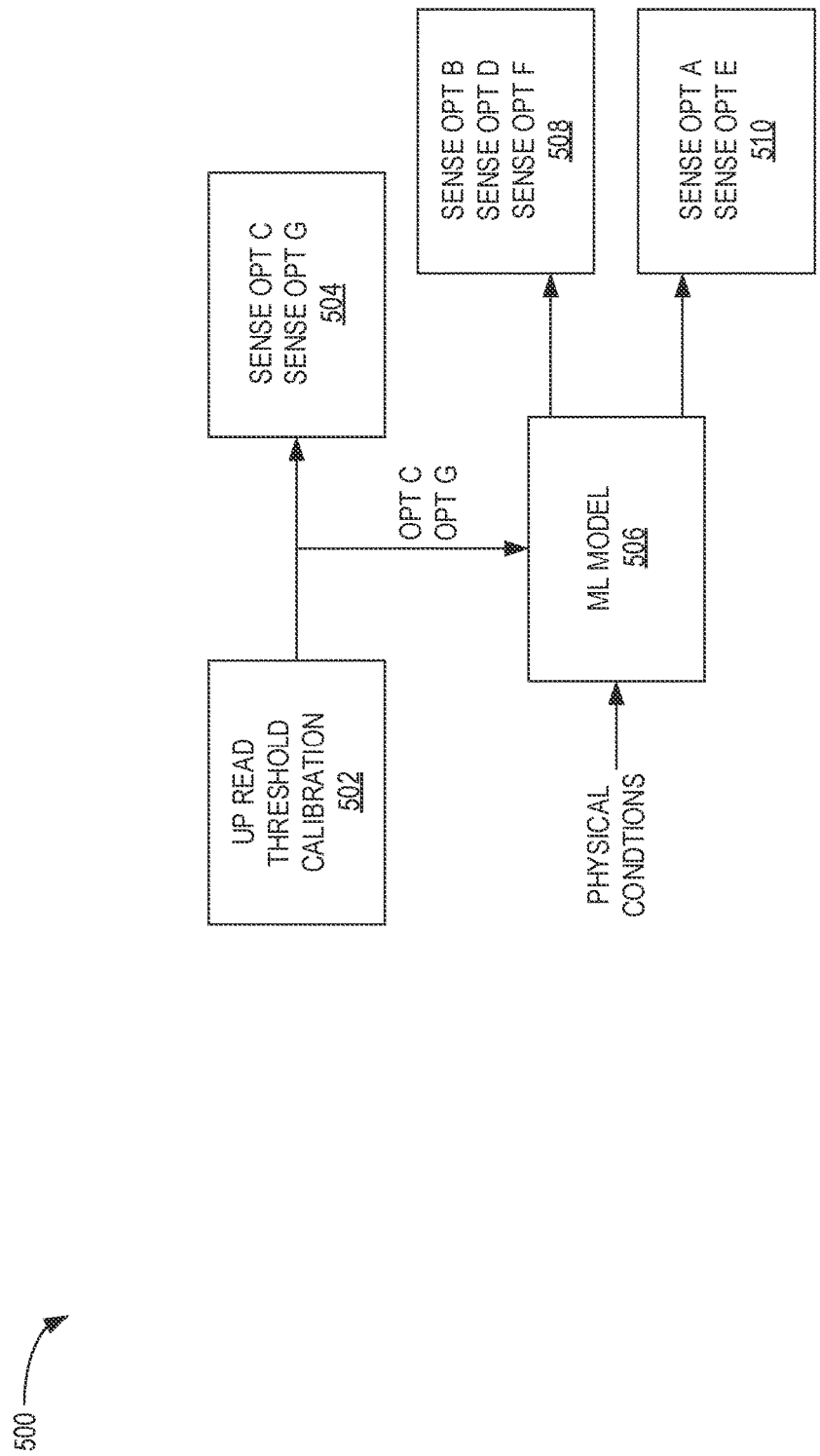
FIG. 5 is a schematic illustration of an operation utilizing a machine learning (ML) model to predict read thresholds of one or more cell states corresponding to one or more other pages of a representative wordline, according to certain embodiments.

FIG. 5 is a schematic illustration of an operation 500 utilizing a ML model to predict read thresholds of one or more cell states corresponding to one or more other pages of a representative wordline, according to certain embodiments. The representative wordline may be a wordline of TLC memory in the NVM 110. In other words, the wordline may have threshold voltages shown in FIG. 2. For exemplary purposes, aspects of the storage system 100 of FIG. 1 and the graph 200 of FIG. 2 may be referenced herein.

At block 502, the controller 108 performs a read threshold calibration operation, which may be a BES operation, on a UP of a representative wordline. At block 504, the optimized read thresholds for cell state C and cell state G are sensed. The optimized read thresholds for cell state C and cell state G are provided to a ML model at block 506, where the ML model utilizes a correlation of a read threshold of one or more cell states of a page of a representative wordline to predict a read threshold of one or more cell states of another page of the representative wordline. Furthermore, one or more physical conditions may be provided to the ML model at block 506 to better calibrate or adjust the model to provide for more accurate results. For example, the one or more physical conditions may be a temperature of the representative wordline, a program/erase count of the representative wordline, a BER of the representative wordline, and the like. The one or more physical conditions may cause the read thresholds of the various cell states of the representative wordline to shift. Thus, using the one or more physical conditions and the optimized read thresholds found from the read threshold calibration operation at block 502, the ML model may be able to predict optimized read thresholds for the other cell states of the representative wordline.

It is to be understood that the ML model may utilize the received one or more physical conditions as well as the received optimized read thresholds to further optimize the model in order to obtain better results. The training of the ML model may be completed using supervised training offline with lab data and other parameters. For example, Random Forest, XGBoost, CatBoost®, and Neural Network may be utilized to train and model the read thresholds of the memory cells of the NVM 110. Likewise, the training of the ML model may be based on an unsupervised clustering of read threshold levels using clustering methods such as Kmeans or Gaussian Clustering methods. Clustering state thresholds in two or three groups, in a non-limiting example, may determine which logical pages to be measured using a read threshold calibration operation, such as BES. It is to be understood that the previously referenced training methods are not intended to be limiting, but to provide an example of possible embodiments. Furthermore, it is to be understood that the controller 108 may determine to perform conventional read threshold calibration operations rather than predicting read thresholds based on the ML model. The determining may be based on a function of a success rate of the ML model in different conditions. For example, if the controller is operating in environment conditions and workloads that were not thoroughly trained on, more conventional read threshold calibrations operations may be utilized to calibrate the read thresholds of a representative wordline. However, if the controller is operating in environment conditions and workloads that were thoroughly trained on, more prediction operations using the ML model may be performed.

At block 508, the ML model provides the optimized read thresholds for the MP, which corresponds with cell state B, cell state D, and cell state F. Likewise, at block 510, the ML model provides the optimized read thresholds for the LP, which corresponds with cell state A and cell state E. The controller 108 may associate the read thresholds of the UP, the MP, and the LP with the representative wordline, such that when reading the representative wordline, the calibrated read thresholds are used.

Figure 6:
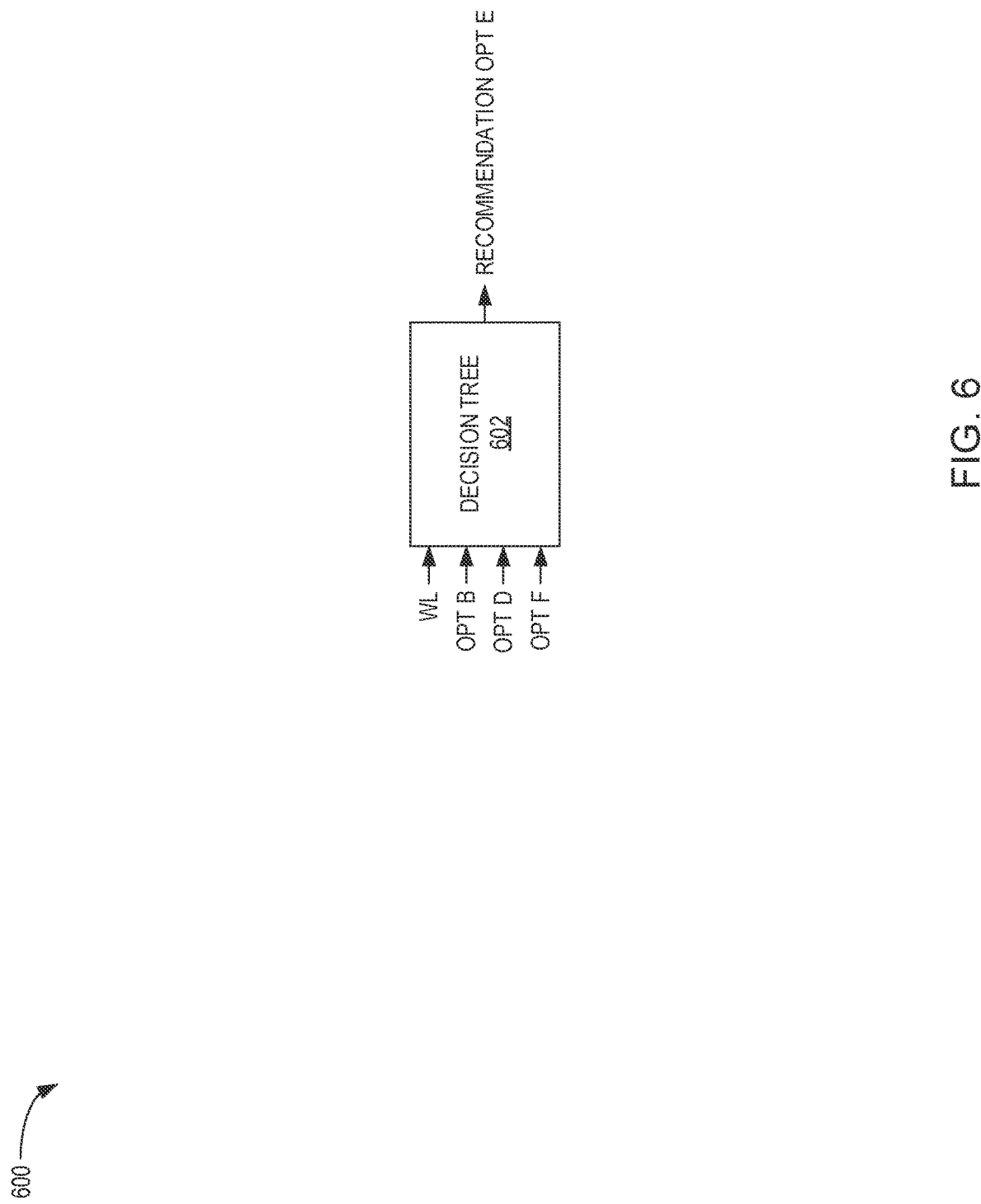
FIG. 6 is an illustration of a ML training operation, according to certain embodiments.

FIG. 6 is an illustration of a ML training operation 600 for TLC memory, according to certain embodiments. The ML training operation 600 includes a decision tree 602, where one or more physical conditions of a representative wordline and calibrated read thresholds of a page of a plurality of pages of the representative wordline are input into the decision tree 602. In the ML training operation 600, the calibrated read thresholds of the MP of the representative wordline, obtained by a read threshold calibration operation, such as a BES operation, is provided to the decision tree 602. The decision tree 602 utilizes the ML model correlating read thresholds of a page of a representative wordline with read thresholds of another page of the representative wordline to predict an optimized read threshold for cell state E.

Figures 7A, 7B:
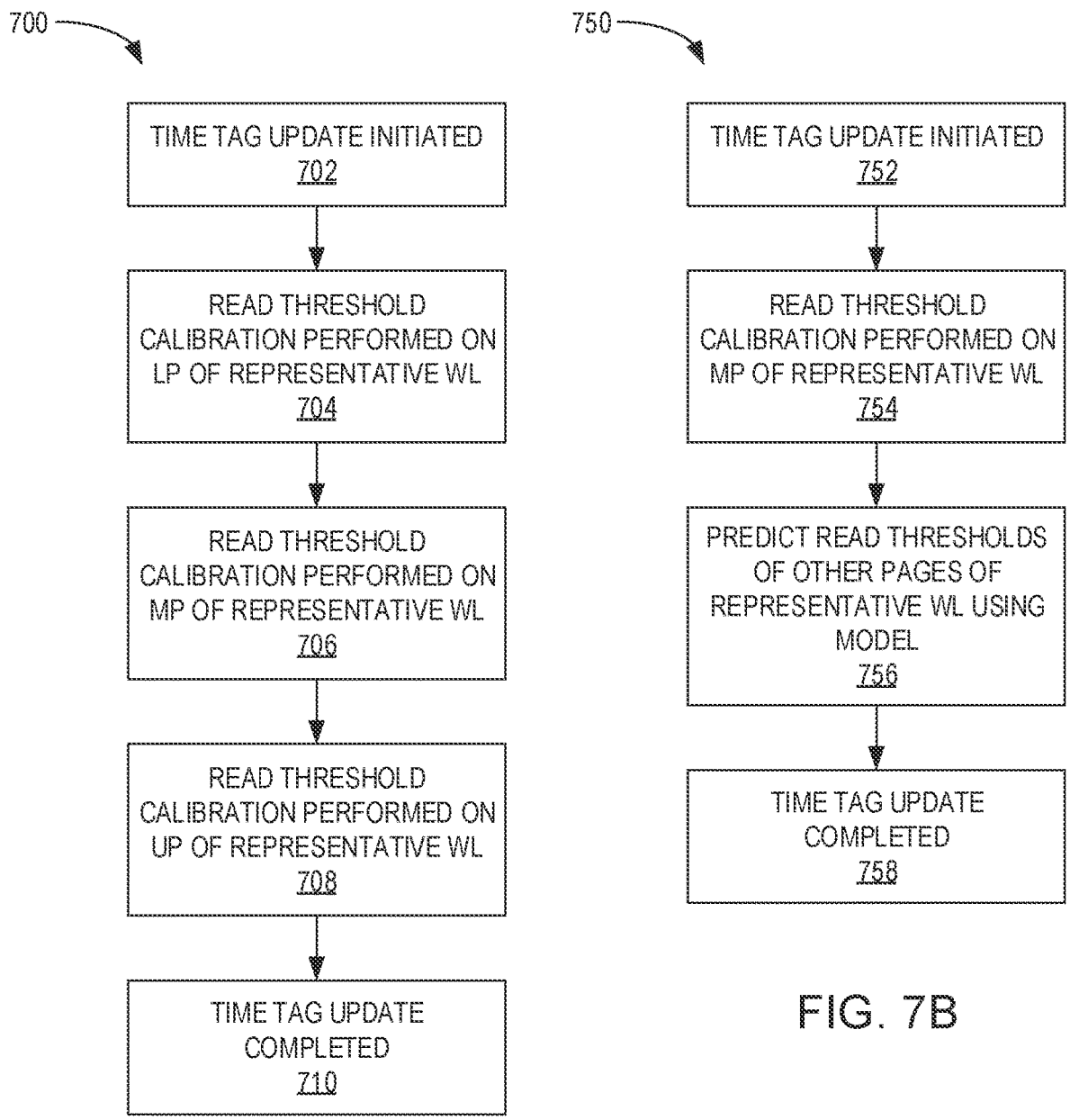
FIG. 7A is a flow diagram illustrating a conventional method of calibrating read thresholds of a representative wordline, according to certain embodiments.
FIG. 7B is a flow diagram illustrating a method of calibrating read thresholds by leveraging a correlation between read thresholds of the cell states of a representative wordline, according to certain embodiments.

FIG. 7A is a flow diagram illustrating a conventional method 700 of calibrating read thresholds of a representative wordline, according to certain embodiments. For exemplary purposes, aspects of the storage system 100 of FIG. 1 and the graph 200 of FIG. 2 may be referenced herein. Method 750 may be implemented by the controller 108.

At block 702, a time tag update is initiated. In another example, conventional method 700 may be triggered by a read failure occurring. It is to be understood that a read threshold calibration operation may be triggered by other operations not listed. At block 704, a read threshold calibration operation is performed on a LP of a representative wordline (WL), where the representative WL is TLC memory. At block 706, a read threshold calibration operation is performed on a MP of the representative WL. At block 708, a read threshold calibration operation is performed on a UP of the representative WL. At block 710, the time tag update is completed.

FIG. 7B is a flow diagram illustrating a method 750 of calibrating read thresholds by leveraging a correlation between read thresholds of the cell states of a representative wordline, according to certain embodiments. For exemplary purposes, aspects of the storage system 100 of FIG. 1 and the graph 200 of FIG. 2 may be referenced herein. Method 750 may be implemented by the controller 108.

At block 752, a time tag update is initiated. In another example, method 750 may be triggered by a read failure occurring. It is to be understood that a read threshold calibration operation may be triggered by other operations not listed. At block 754, a read threshold calibration operation is performed on a MP of a representative WL, where the representative WL is TLC memory. At block 756, the controller 108 predicts the read thresholds of the other pages (i.e., the LP and the UP of the representative WL) using the model, where the model may be a ML model. The read thresholds of the MP representative WL are provided to the model along with the one or more physical conditions of the representative WL. Based on the correlation values of the model, the one or more physical conditions of the representative WL, and the read thresholds of the MP of the representative WL, the model predicts the read thresholds of the other pages (i.e., the LP and the UP of the representative WL). At block 758, the time tag update is completed.

By utilizing a model that correlates read thresholds of one page to another page of the representative wordline and accounts for the one or more physical conditions of the representative wordline, a completion speed of a read threshold calibration operation for the representative wordline may be faster, which may result in improved data storage device performance.

In one embodiment, a data storage device includes a memory device and a controller coupled to the memory device. The controller is configured to perform a read threshold calibration operation on a first page of a plurality of pages of a representative wordline of the memory device to obtain a read threshold of one or more cell states associated with the first page of the representative wordline, determine one or more physical conditions of the representative wordline, and generate one or more other read thresholds for one or more other cell states associated with one or more other pages of the representative wordline using a machine learning model based on the read threshold of the one or more cell states associated with the first page of the representative wordline and the one or more physical conditions of the representative wordline.

The read threshold calibration operation is not performed on the one or more other pages of the representative wordline. The machine learning model correlates the read threshold of the one or more cell states associated with the first page of the representative wordline with the one or more other read thresholds of the one or more other cell states associated with the one or more other pages of the representative wordline. The generating comprises inputting the read threshold of the one or more cell states associated with the first page of the representative wordline and the one or more physical conditions of the representative wordline into the machine learning model. The one or more physical conditions of the representative wordline includes a temperature, a program/erase cycle count, and a bit error rate. The representative wordline is multi-level cell (MLC) memory, triple level cell (TLC) memory, or quad level cell (QLC) memory. The machine learning model is trained offline using supervised training. The machine learning model is trained based unsupervised clustering of read thresholds levels using clustering methods. The controller is further configured to apply the generated one or more other read thresholds of the one or more other cell states associated with the one or more other pages of the representative wordline to the one or more other cell states associated with the one or more other pages of the representative wordline.

The controller is further configured to determine a workload associated with the representative wordline, determine that either the workload associated with the representative wordline or the one or more physical conditions of the representative wordline does not conform to the machine learning model, and perform the read threshold calibration, responsive to determining that either the workload associated with the representative wordline or the one or more physical conditions of the representative wordline does not conform to the machine learning model, the one or more other read thresholds for the one or more other cell states associated with the one or more other pages of the representative wordline. Generating the one or more other read thresholds for the one or more other cell states associated with the one or more other pages of the representative wordline using the machine learning model occurs when both the workload associated with the representative wordline and the one or more physical conditions of the representative wordline conforms to the machine learning model.

In another embodiment, a data storage device includes a memory device and a controller coupled to the memory device. The controller is configured to generate and update a model correlating a read threshold of one or more cell states of a first page of a representative wordline to a read threshold of one or more other cell states of a second page of the representative wordline, predict calibrated read thresholds of a cell state of a page of the representative wordline based on the model, where a read threshold calibration operation is not performed on the page of the representative wordline, and associate the predicted calibrated read thresholds of the cell state of the page of the representative wordline with a corresponding read threshold of the cell state of the page of the representative wordline.

The model is a machine learning model. The predicted calibrated read thresholds of the cell state of the page of the representative wordline is predicted utilizing read thresholds of one or more cell states associated with another page of the representative wordline obtained using the read threshold calibration. The predicting further utilizes one or more physical conditions of the representative wordline. The one or more physical conditions of the representative wordline includes a temperature, a program/erase cycle count, and a bit error rate. The predicting, for quad level cell (QLC) memory, further utilizes read thresholds of one or more cell states associated with another, another page of the representative wordline obtained using the read threshold calibration. The controller is further configured to maintain a record of a success rate of utilizing the model to predict a calibrated read threshold for a cell state of a page of the representative wordline and either predict the calibrated read threshold for the cell state of the page of the representative wordline using the model or perform the read calibration operation to obtain the calibrated read threshold of the cell state of the page. The predicting occurs when the success rate is greater than or equal to a threshold value. The performing the read calibration operation occurs when the success rate is less than the threshold value.

In another embodiment, a data storage device includes memory means and a controller coupled to the memory means. The controller is configured to perform a read threshold calibration operation on less than all of a total number of pages of a plurality of pages of a representative wordline and predict a read threshold of one or more cell states of a remaining number of pages of the plurality of pages of the representative wordline. The read threshold calibration operation is not performed on the remaining number of pages of the plurality of pages of the representative wordline.

The controller is further configured to utilize the predicted read threshold of the one or more cell states of the remaining number of pages of the plurality of pages of the representative wordline as a calibrated read threshold for the one or more cell states of the remaining number of pages of the plurality of pages of the representative wordline. The predicting utilizes a machine learning model correlating the read threshold of one or more cell states associated with the less than all of a total number of pages of a plurality of pages of a representative wordline with the read threshold of the one or more cell states of the remaining number of pages of the plurality of pages of the representative wordline.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
perform a read threshold calibration operation on a first page of a plurality of pages of a representative wordline of the memory device to obtain a read threshold of one or more cell states associated with the first page of the representative wordline;
determine one or more physical conditions of the representative wordline; and
generate one or more other read thresholds for one or more other cell states associated with one or more other pages of the representative wordline using a machine learning model based on the read threshold of the one or more cell states associated with the first page of the representative wordline and the one or more physical conditions of the representative wordline.

2. The data storage device of claim 1, wherein the read threshold calibration operation is not performed on the one or more other pages of the representative wordline.

3. The data storage device of claim 1, wherein the machine learning model correlates the read threshold of the one or more cell states associated with the first page of the representative wordline with the one or more other read thresholds of the one or more other cell states associated with the one or more other pages of the representative wordline.

4. The data storage device of claim 1, wherein the generating comprises inputting the read threshold of the one or more cell states associated with the first page of the representative wordline and the one or more physical conditions of the representative wordline into the machine learning model.

5. The data storage device of claim 1, wherein the one or more physical conditions of the representative wordline comprises:
a temperature;
a program/erase cycle count; and
a bit error rate.

6. The data storage device of claim 1, wherein the representative wordline is multi-level cell (MLC) memory, triple level cell (TLC) memory, or quad level cell (QLC) memory.

7. The data storage device of claim 1, wherein the machine learning model is trained offline using supervised training.

8. The data storage device of claim 1, wherein the machine learning model is trained based unsupervised clustering of read thresholds levels using clustering methods.

9. The data storage device of the claim 1, wherein the controller is further configured to apply the generated one or more other read thresholds of the one or more other cell states associated with the one or more other pages of the representative wordline to the one or more other cell states associated with the one or more other pages of the representative wordline.

10. The data storage device of claim 1, wherein the controller is further configured to:
determine a workload associated with the representative wordline;
determine that either the workload associated with the representative wordline or the one or more physical conditions of the representative wordline does not conform to the machine learning model; and
perform the read threshold calibration, responsive to determining that either the workload associated with the representative wordline or the one or more physical conditions of the representative wordline does not conform to the machine learning model, the one or more other read thresholds for the one or more other cell states associated with the one or more other pages of the representative wordline, wherein:
generating the one or more other read thresholds for the one or more other cell states associated with the one or more other pages of the representative wordline using the machine learning model occurs when both the workload associated with the representative wordline and the one or more physical conditions of the representative wordline conforms to the machine learning model.

11. A data storage device, comprising:
a memory device; and
a controller coupled to the memory device, wherein the controller is configured to:
generate and update a model correlating a read threshold of one or more cell states of a first page of a representative wordline to a read threshold of one or more other cell states of a second page of the representative wordline;
predict calibrated read thresholds of a cell state of a page of the representative wordline based on the model, wherein a read threshold calibration operation is not performed on the page of the representative wordline; and
associate the predicted calibrated read thresholds of the cell state of the page of the representative wordline with a corresponding read threshold of the cell state of the page of the representative wordline, wherein the model is a machine learning model.

12. The data storage device of claim 11, wherein the predicted calibrated read thresholds of the cell state of the page of the representative wordline is predicted utilizing read thresholds of one or more cell states associated with another page of the representative wordline obtained using the read threshold calibration.

13. The data storage device of claim 12, wherein:
the predicting further utilizes one or more physical conditions of the representative wordline; and
the one or more physical conditions of the representative wordline comprises:

a temperature;
a program/erase cycle count; and
a bit error rate.

14. The data storage device of claim 12, wherein the predicting, for quad level cell (QLC) memory, further utilizes read thresholds of one or more cell states associated with another, another page of the representative wordline obtained using the read threshold calibration.

15. A data storage device, comprising:
a memory device; and
a controller coupled to the memory device, wherein the controller is configured to:
   generate and update a model correlating a read threshold of one or more cell states of a first page of a representative wordline to a read threshold of one or more other cell states of a second page of the representative wordline;
   predict calibrated read thresholds of a cell state of a page of the representative wordline based on the model, wherein a read threshold calibration operation is not performed on the page of the representative wordline;
   associate the predicted calibrated read thresholds of the cell state of the page of the representative wordline with a corresponding read threshold of the cell state of the page of the representative wordline;
   maintain a record of a success rate of utilizing the model to predict a calibrated read threshold for a cell state of a page of the representative wordline; and
   either:
      predict the calibrated read threshold for the cell state of the page of the representative wordline using the model; or
      perform the read calibration operation to obtain the calibrated read threshold of the cell state of the page.

16. The data storage device of claim 15, wherein:
the predicting occurs when the success rate is greater than or equal to a threshold value; and
the performing the read calibration operation occurs when the success rate is less than the threshold value.

17. A data storage device, comprising:
memory means; and
a controller coupled to the memory means, wherein the controller is configured to:
   perform a read threshold calibration operation on less than all of a total number of pages of a plurality of pages of a representative wordline; and
   predict a read threshold of one or more cell states of a remaining number of pages of the plurality of pages of the representative wordline, wherein the read threshold calibration operation is not performed on the remaining number of pages of the plurality of pages of the representative wordline, wherein the predicting utilizes a machine learning model correlating the read threshold of one or more cell states associated with the less than all of a total number of pages of a plurality of pages of a representative wordline with the read threshold of the one or more cell states of the remaining number of pages of the plurality of pages of the representative wordline.

18. The data storage device of claim 17, wherein the controller is further configured to utilize the predicted read threshold of the one or more cell states of the remaining number of pages of the plurality of pages of the representative wordline as a calibrated read threshold for the one or more cell states of the remaining number of pages of the plurality of pages of the representative wordline.

* * * * *